Figure 1:
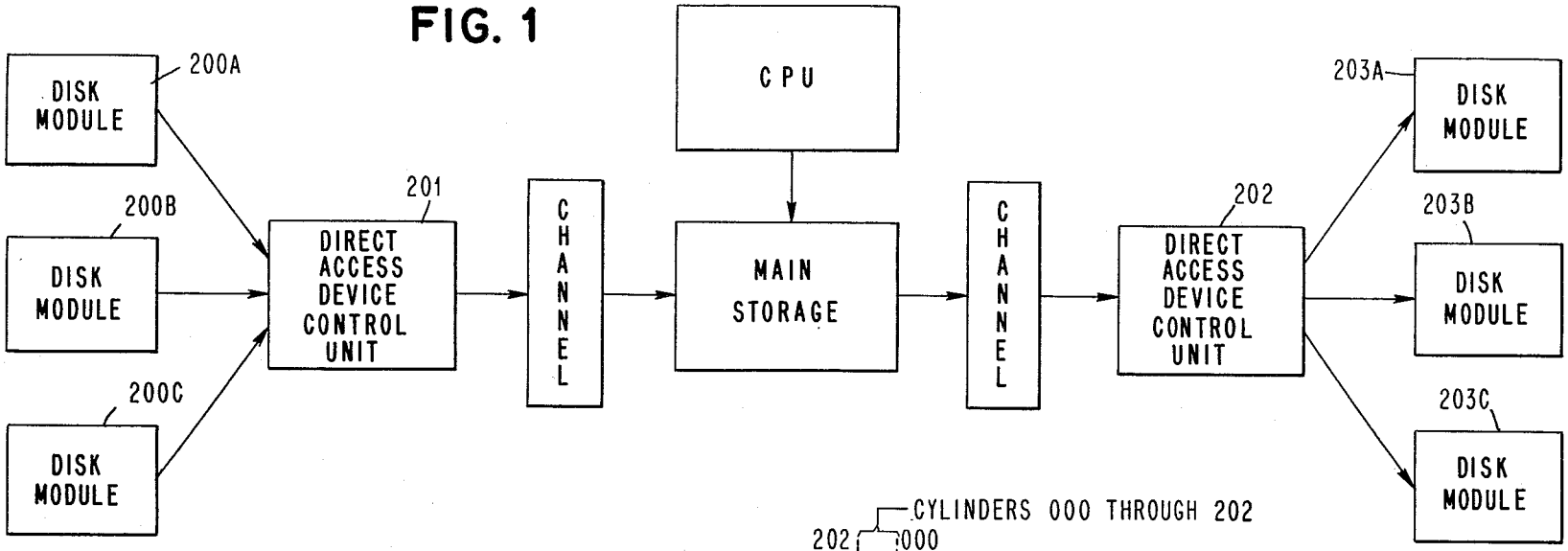
Figure 2:
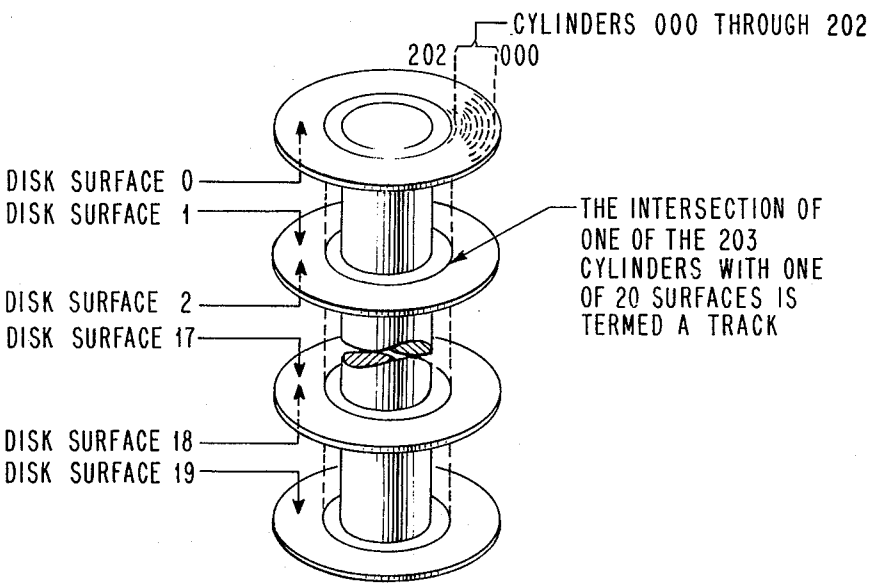
Figure 3A:
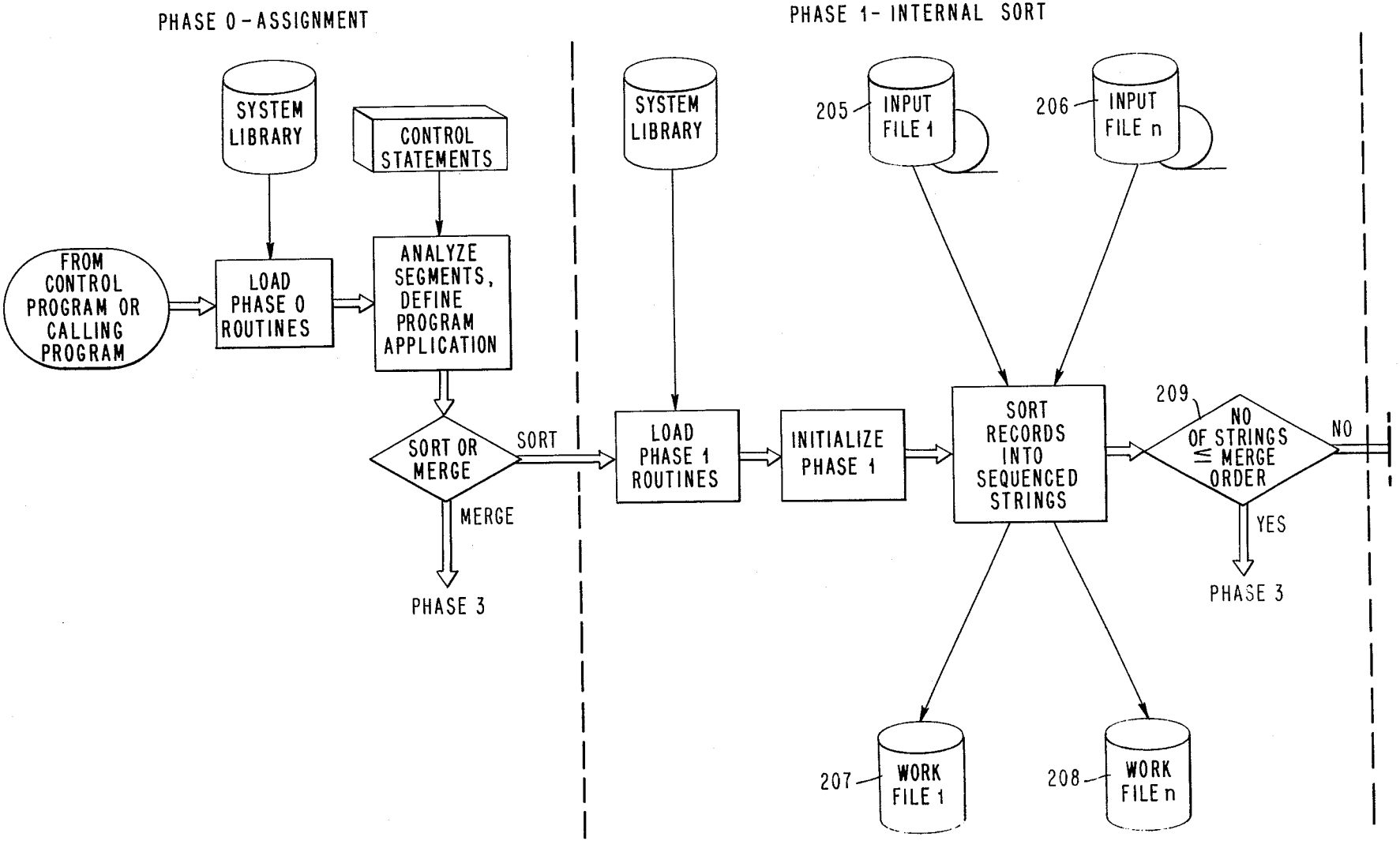
Figure 3B:
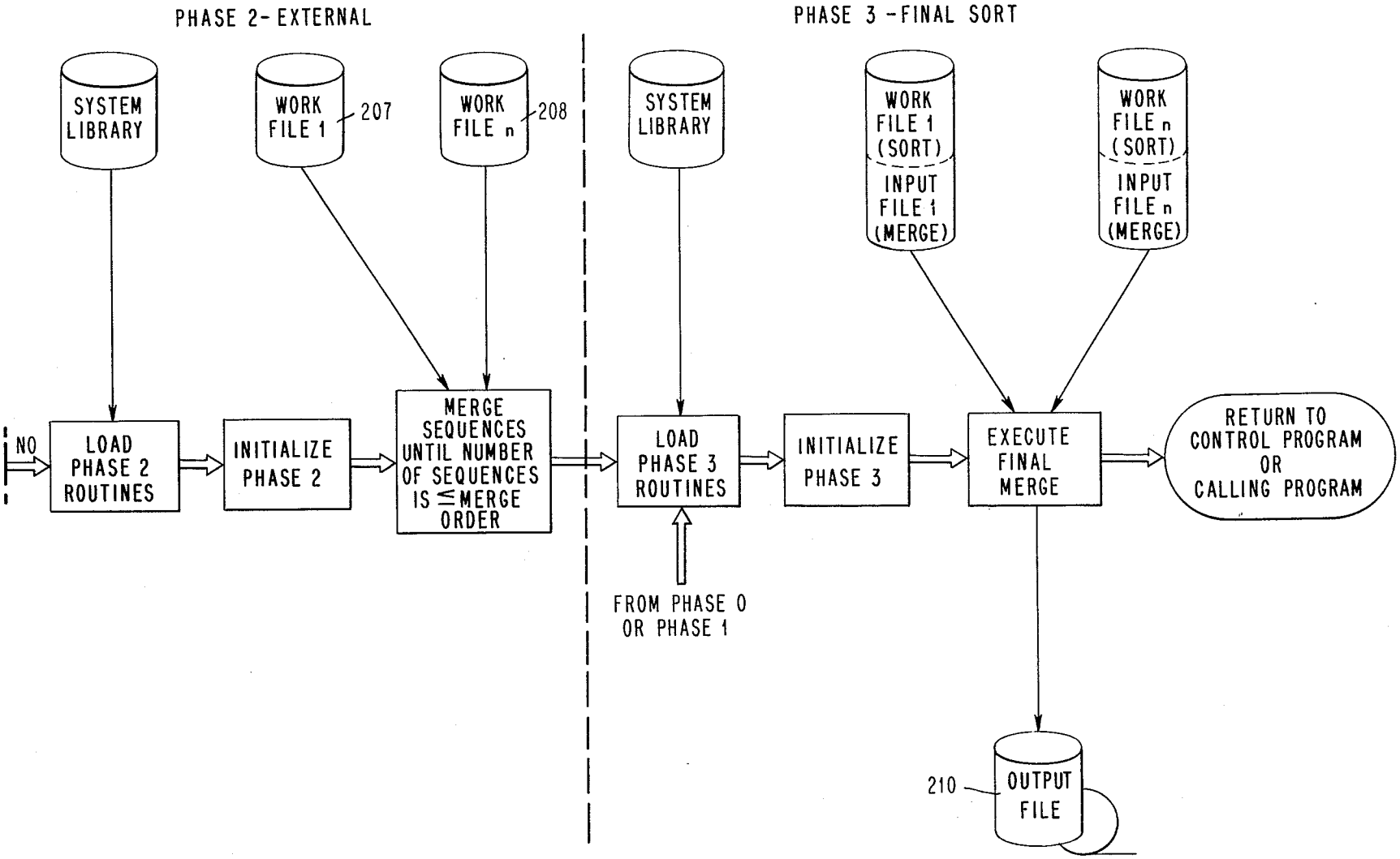
Figure 4:
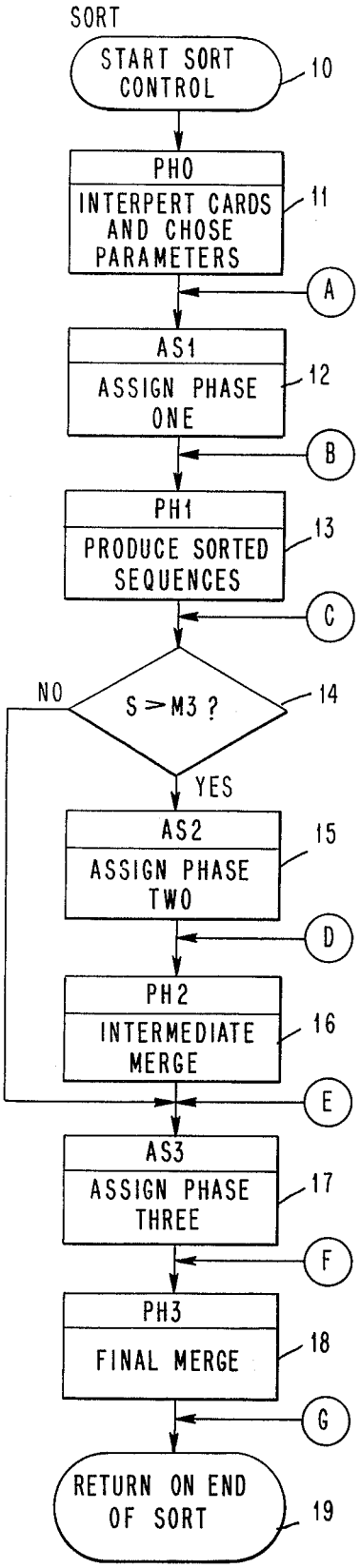
Figure 5:
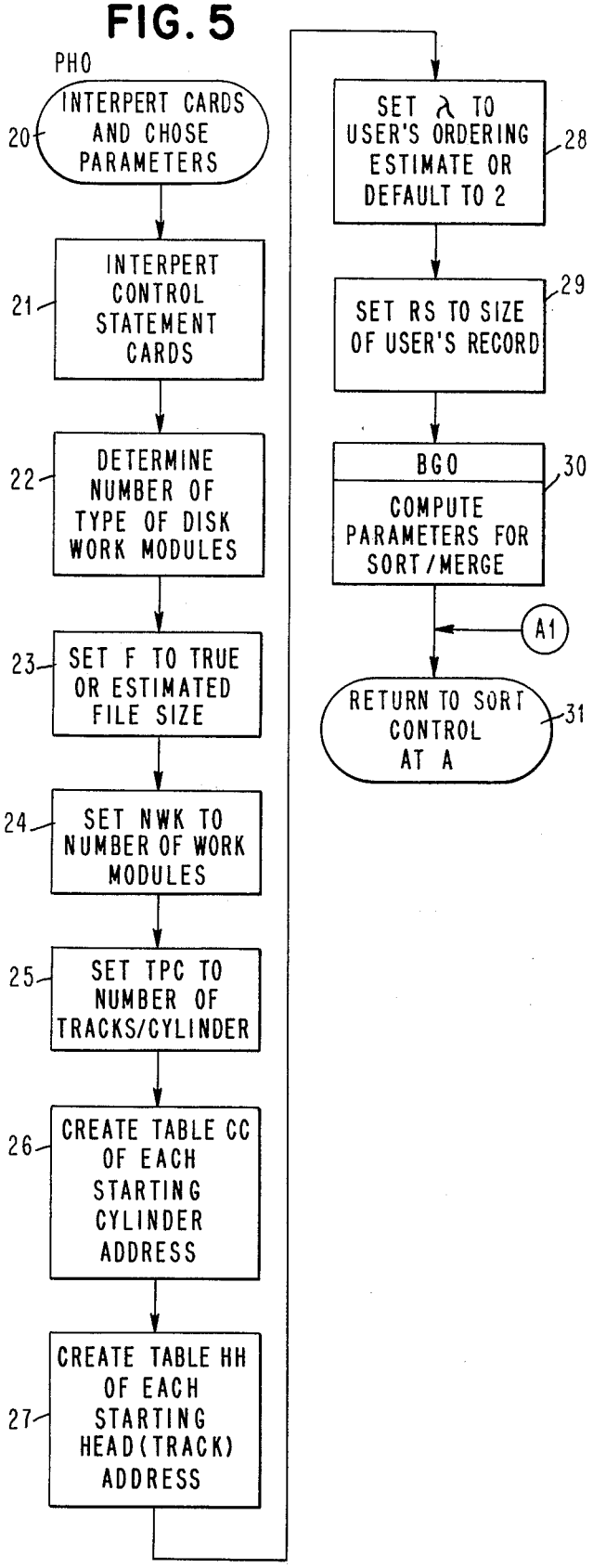
Figure 6:
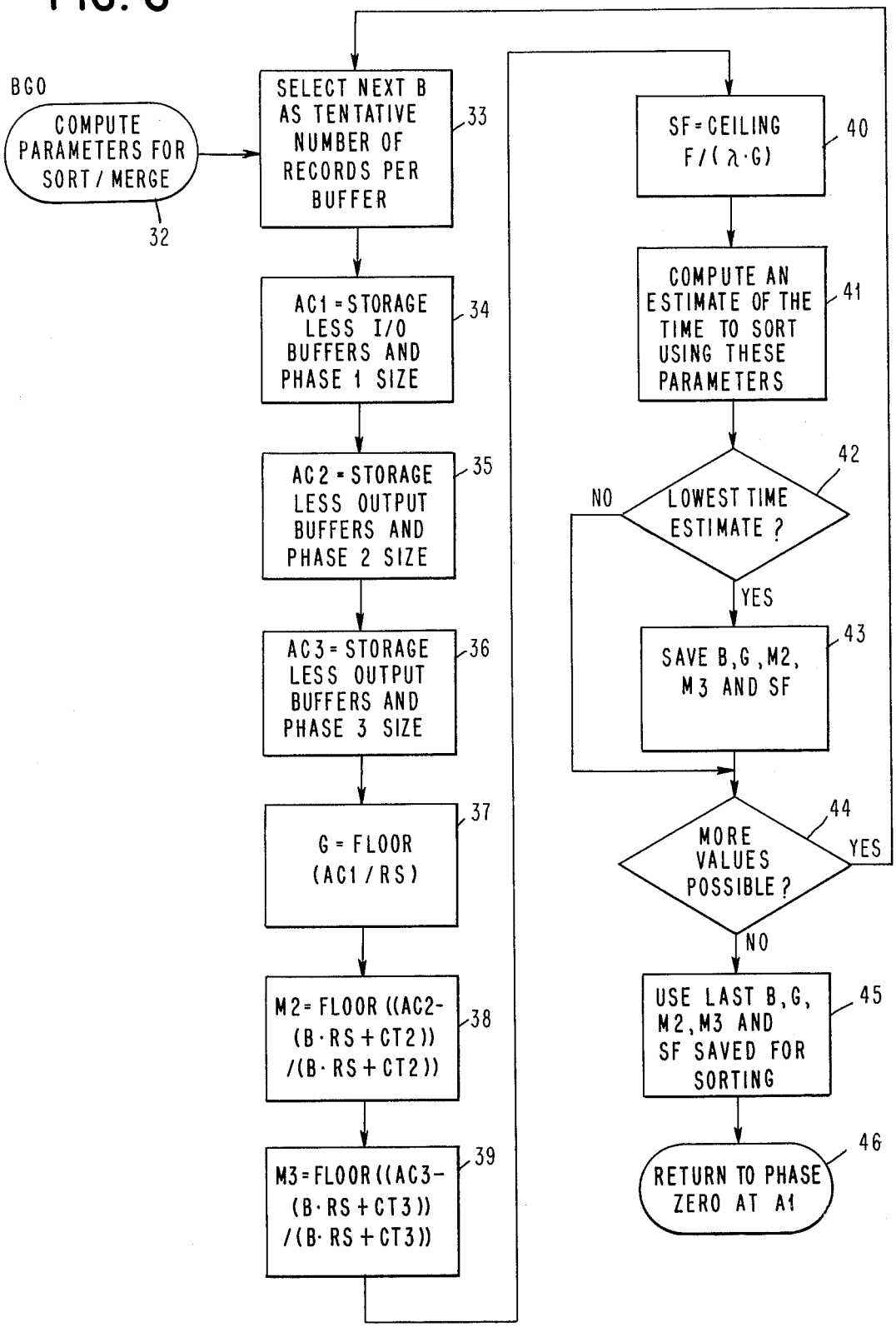
Figure 7:
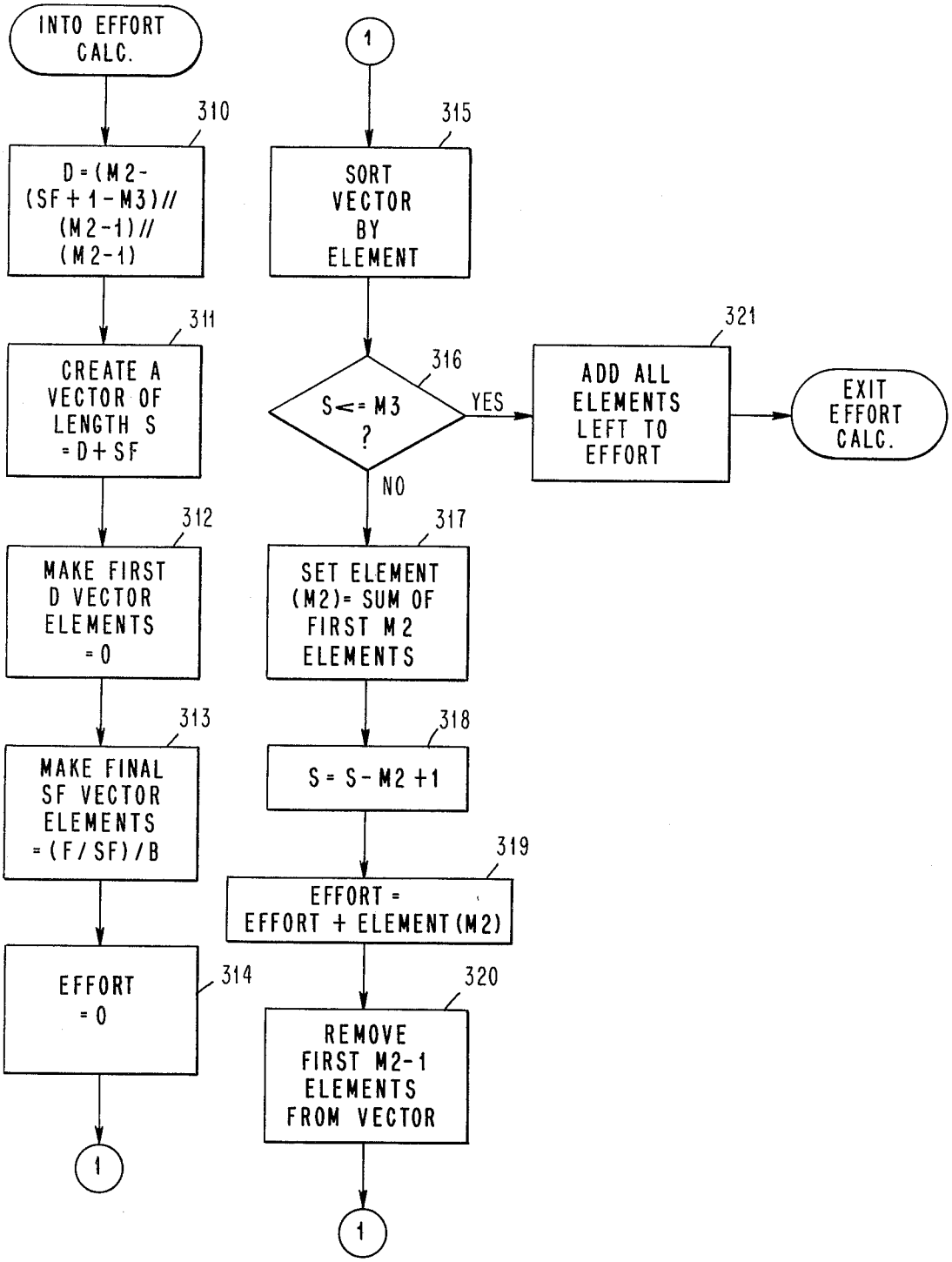
Figure 8:
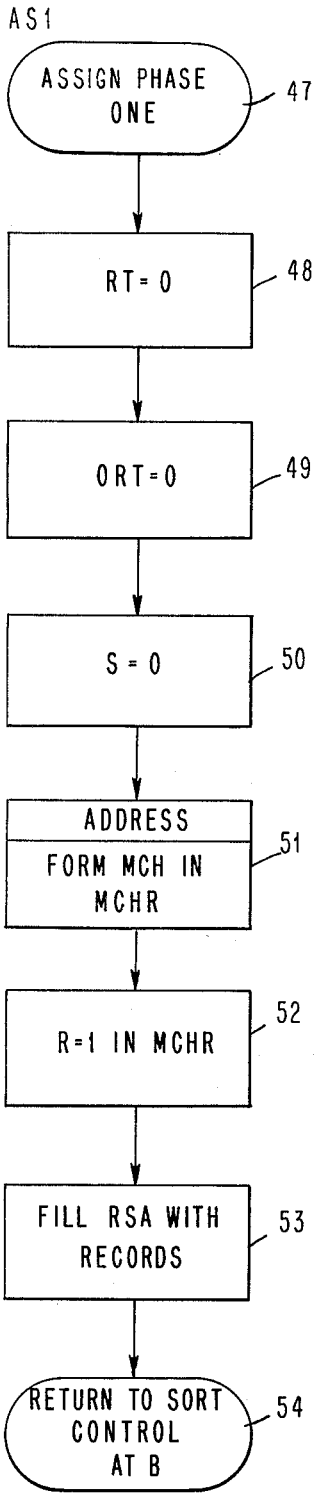
Figure 10:
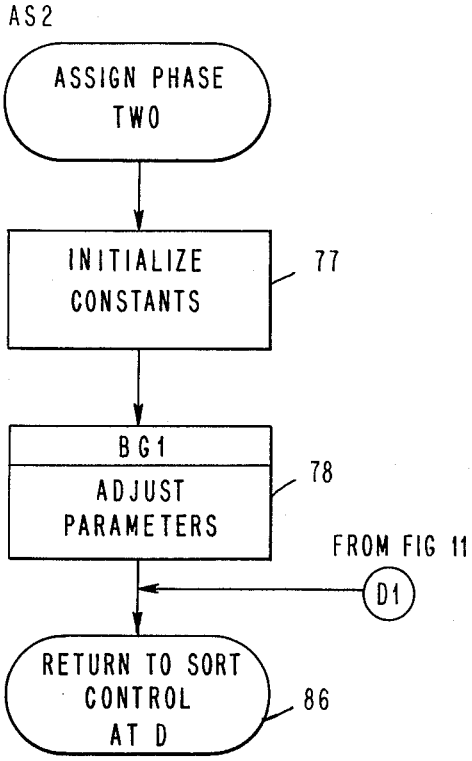
Figure 9A:
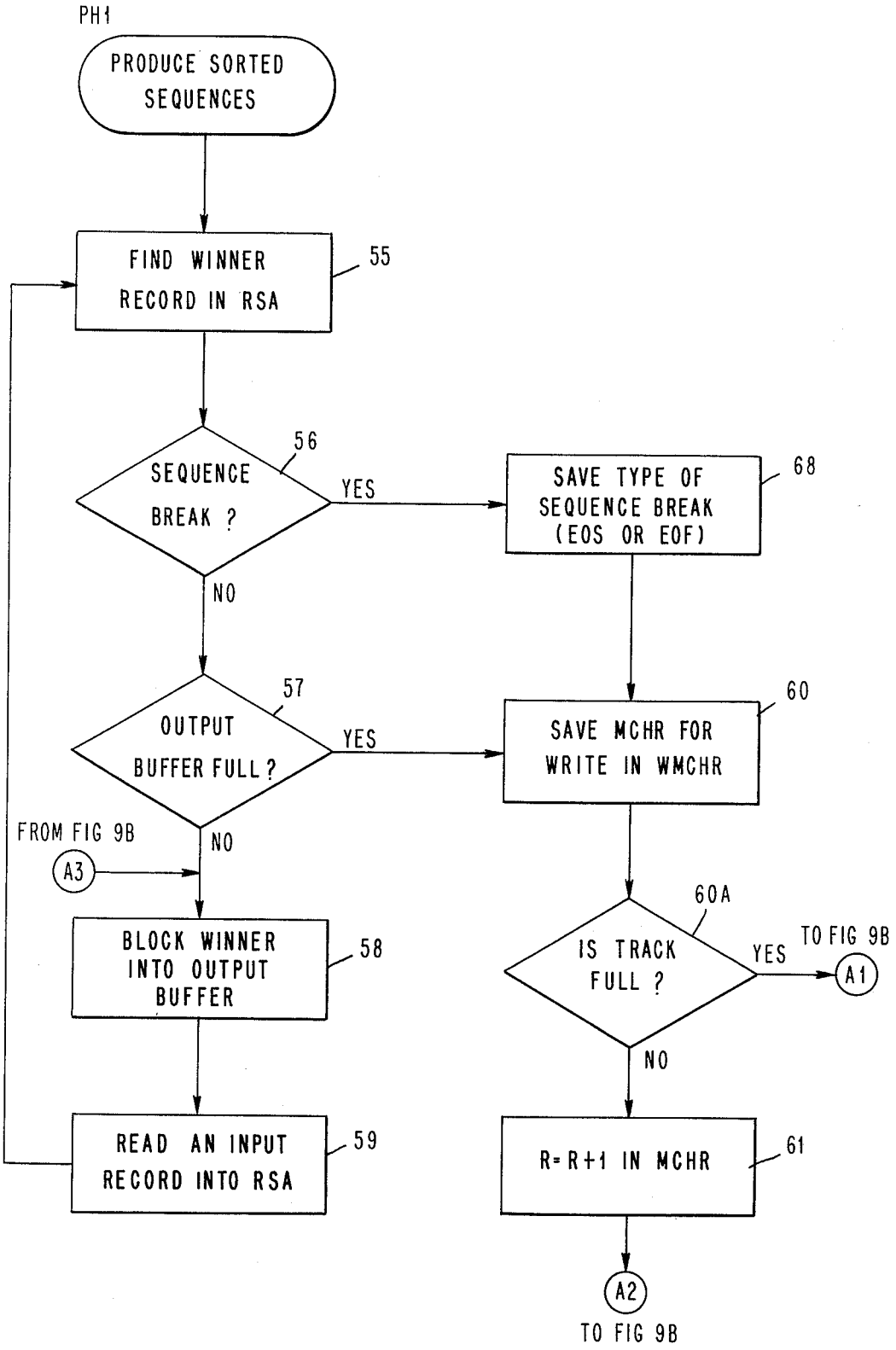
Figure 9B:
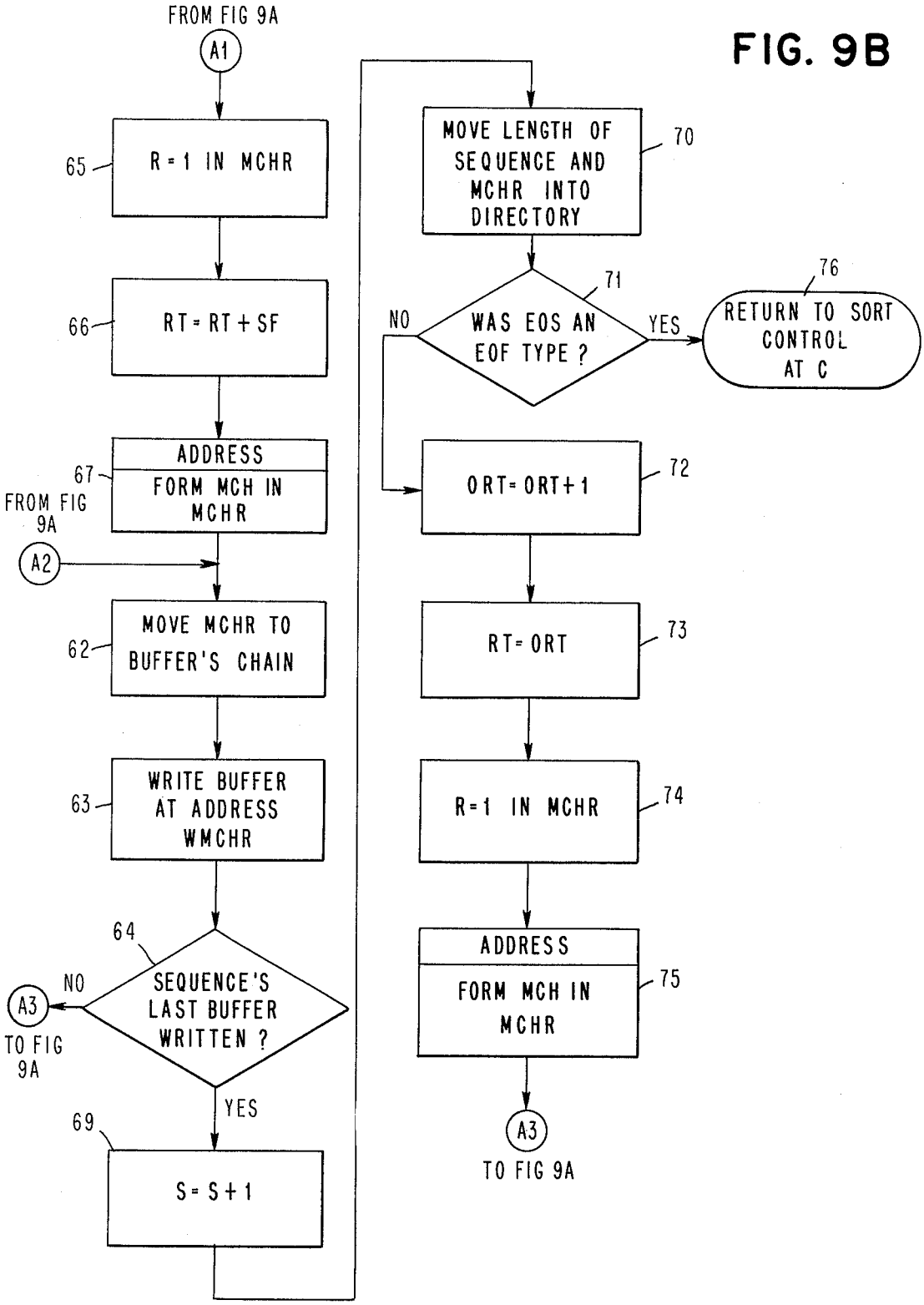
Figure 11:
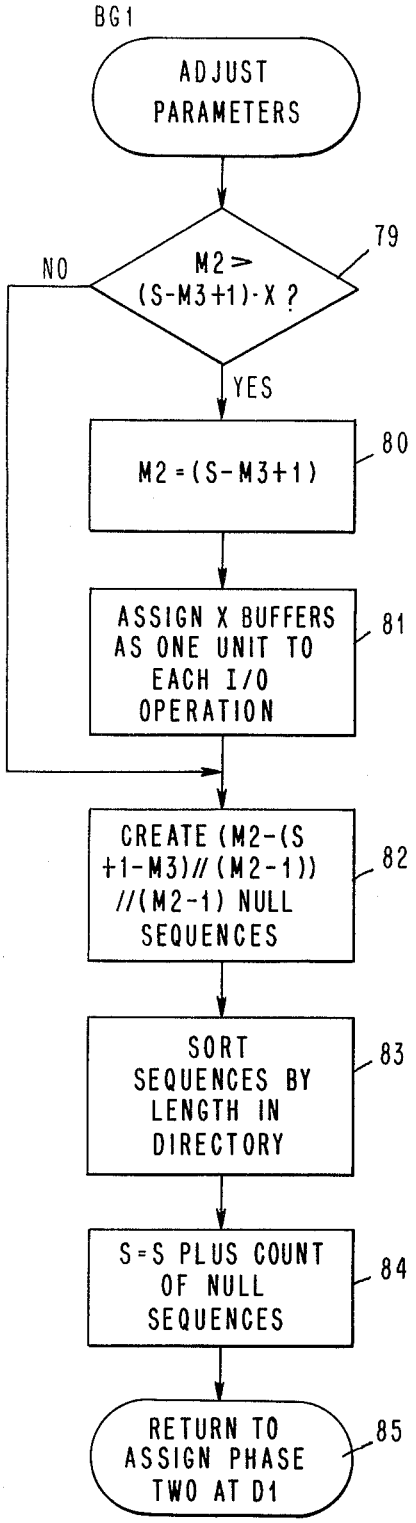
Figure 13:
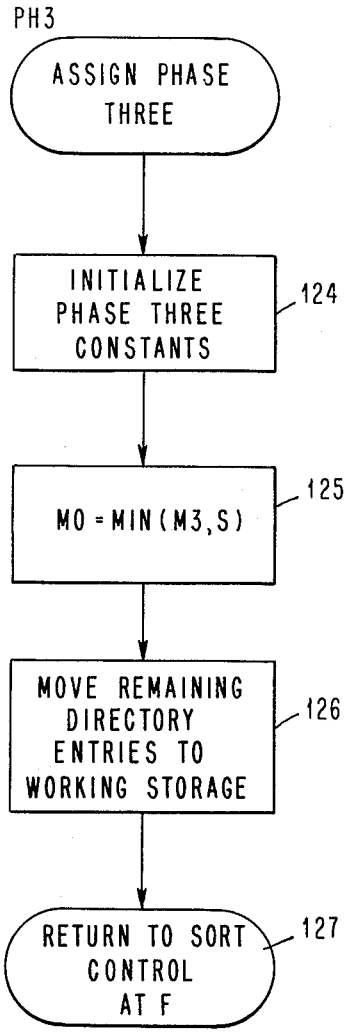
Figure 12A:
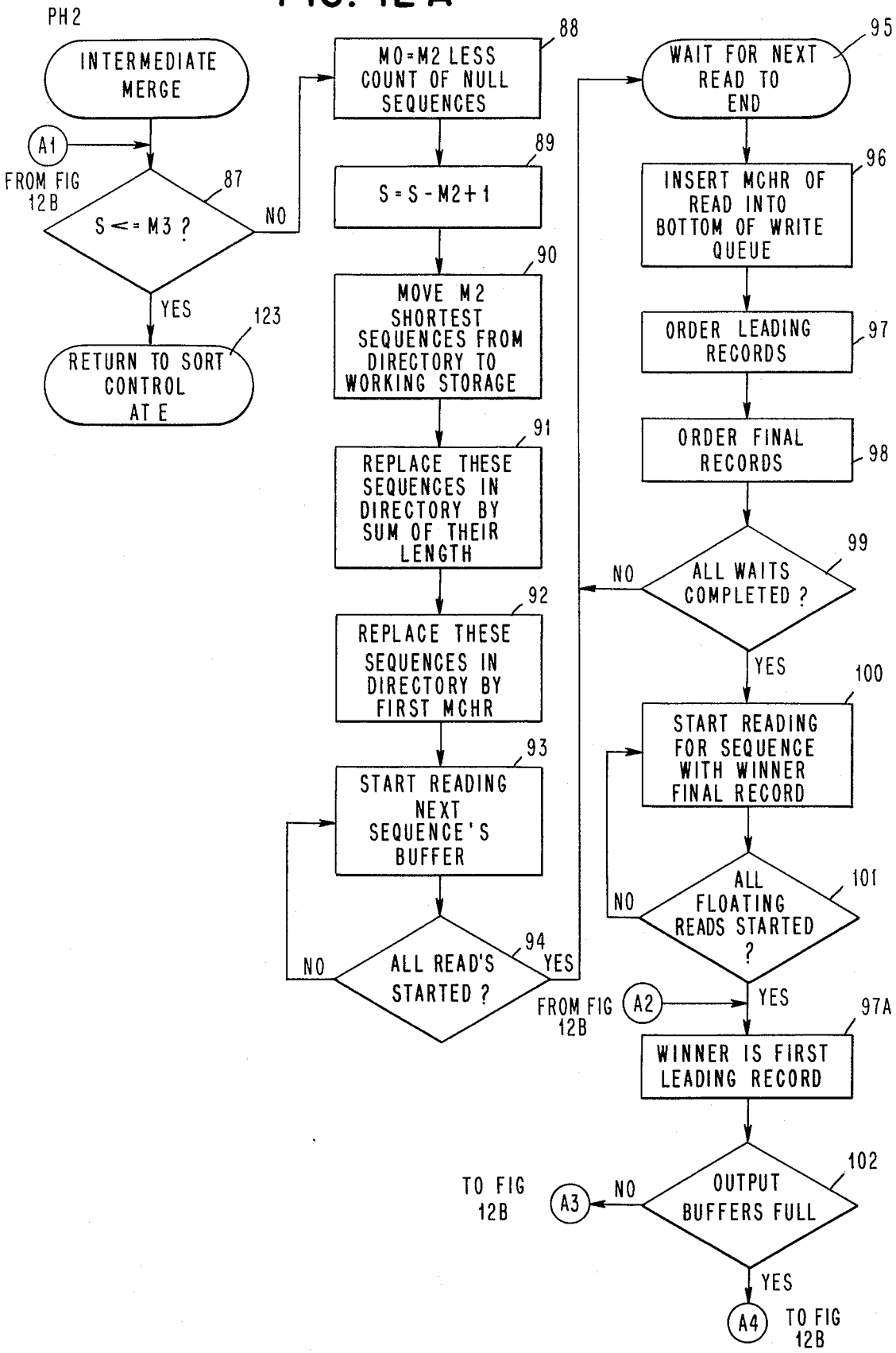
Figure 12B:
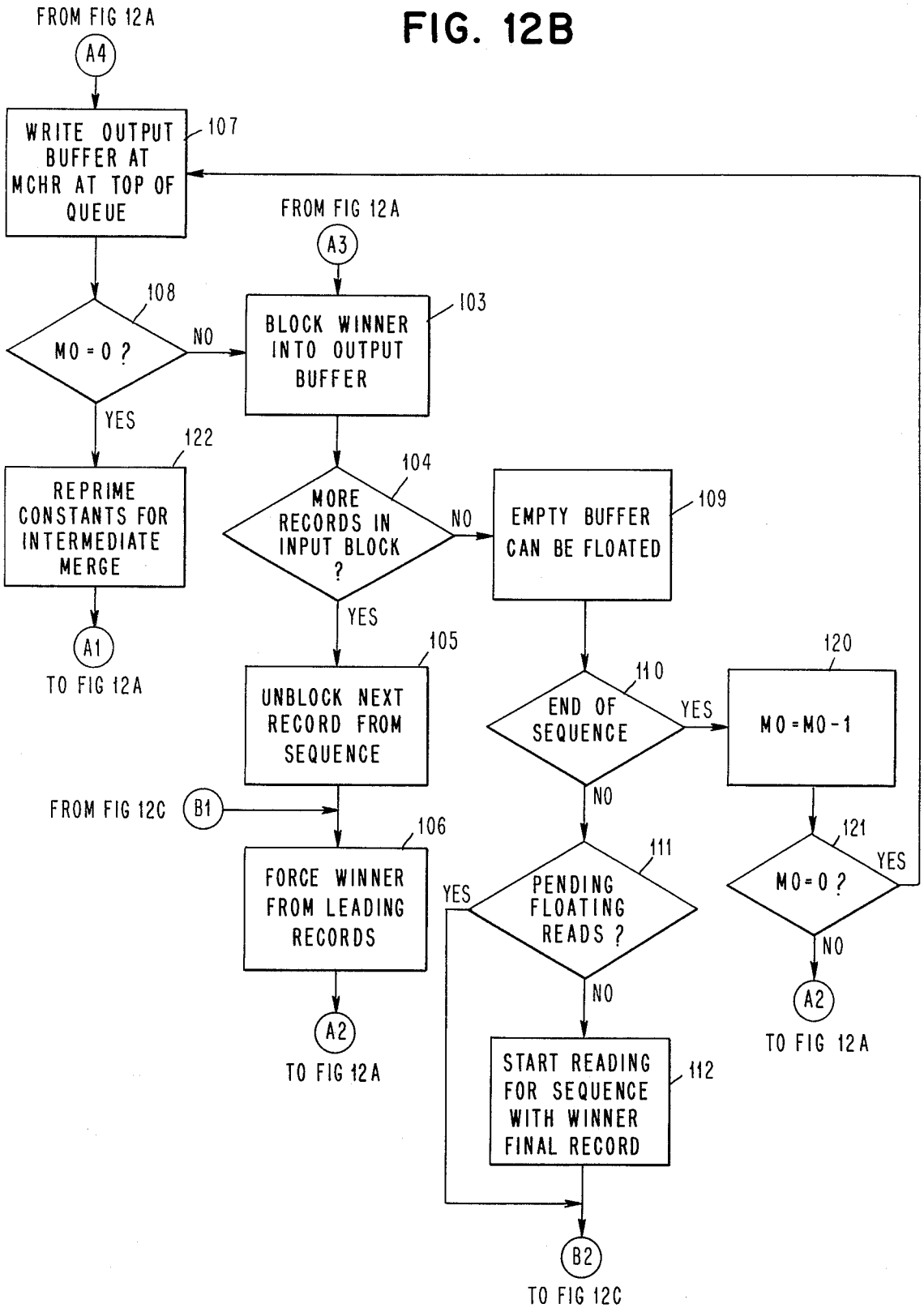
Figure 12C:
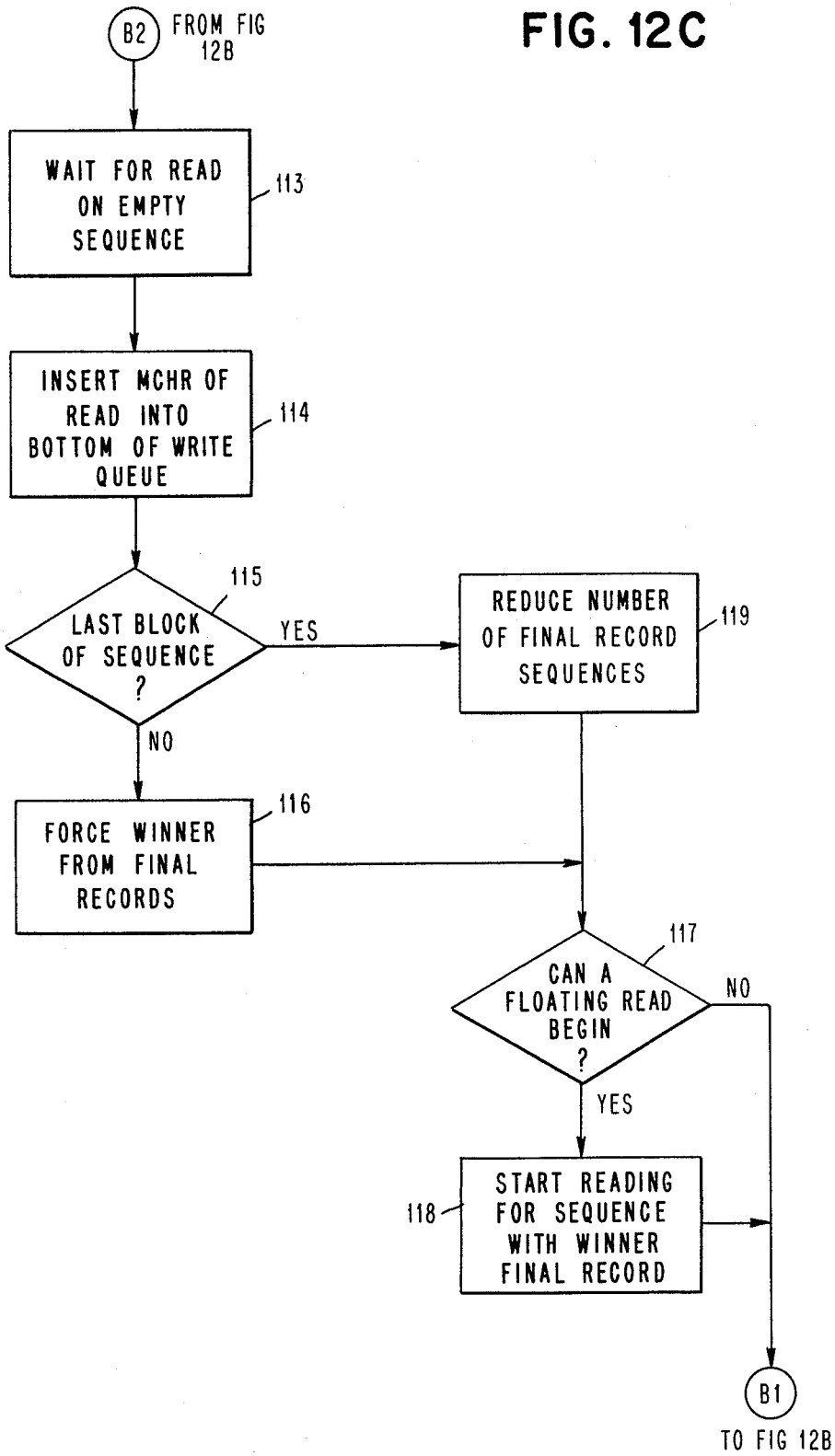
Figure 14A:
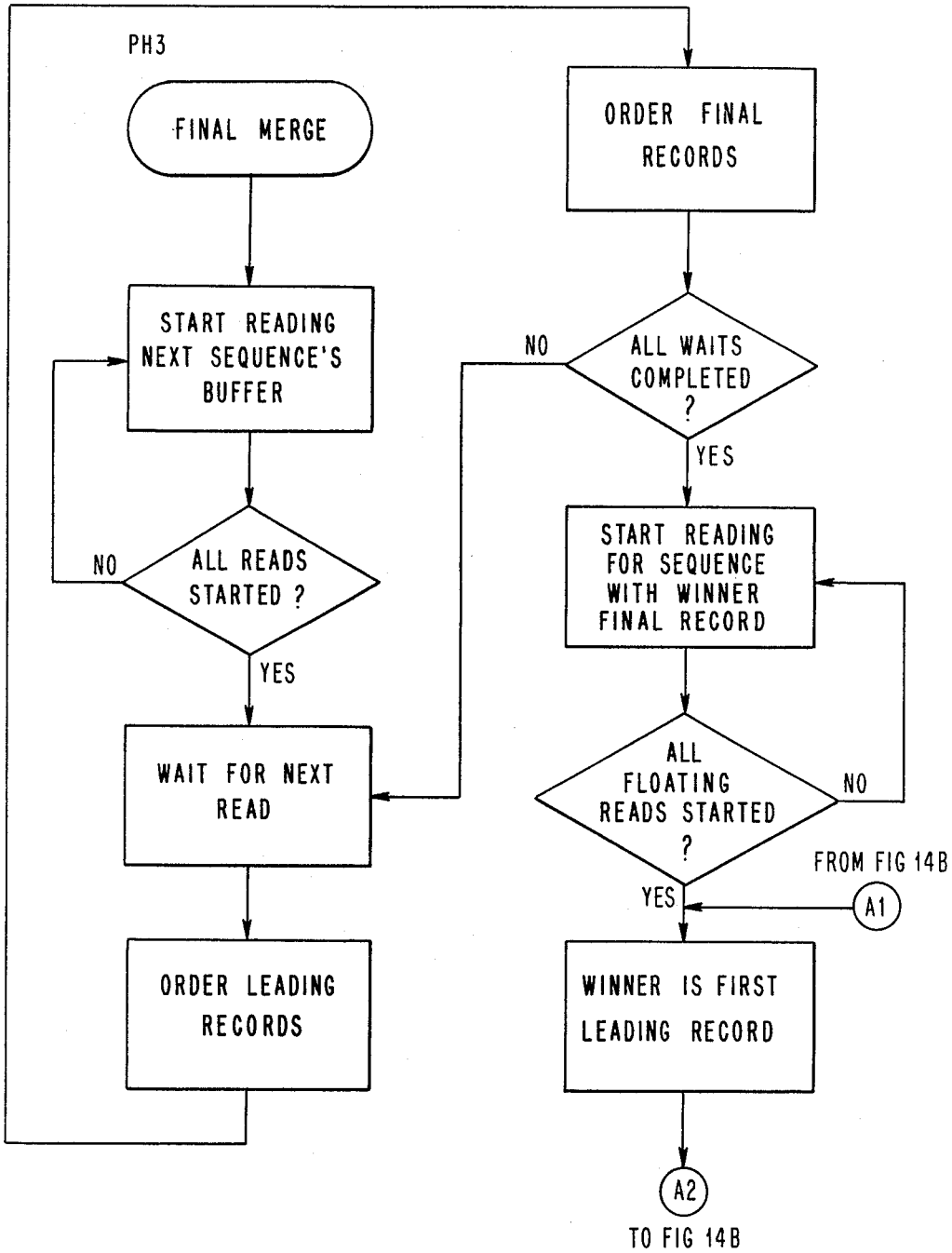
Figure 14B:
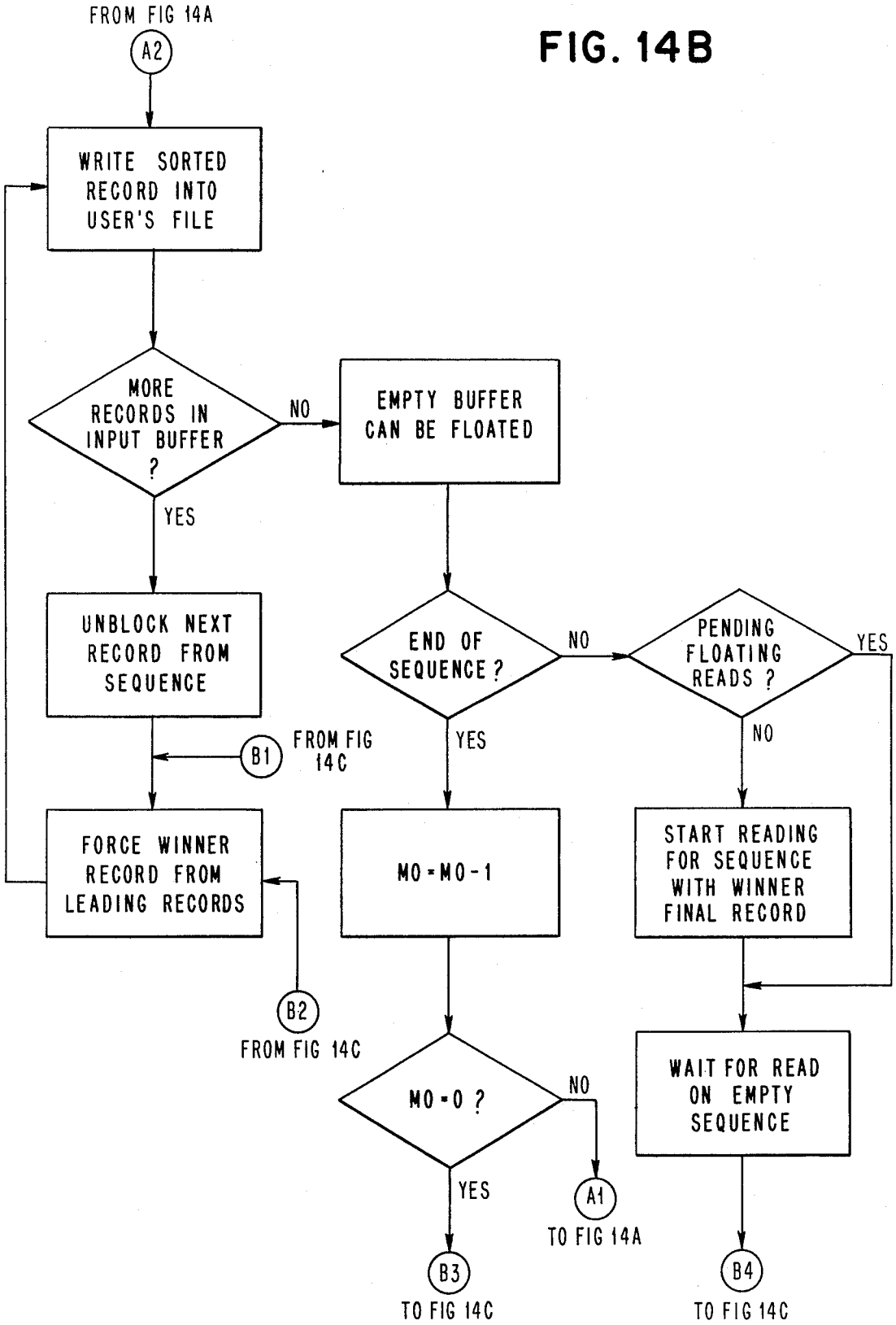
Figure 14C:
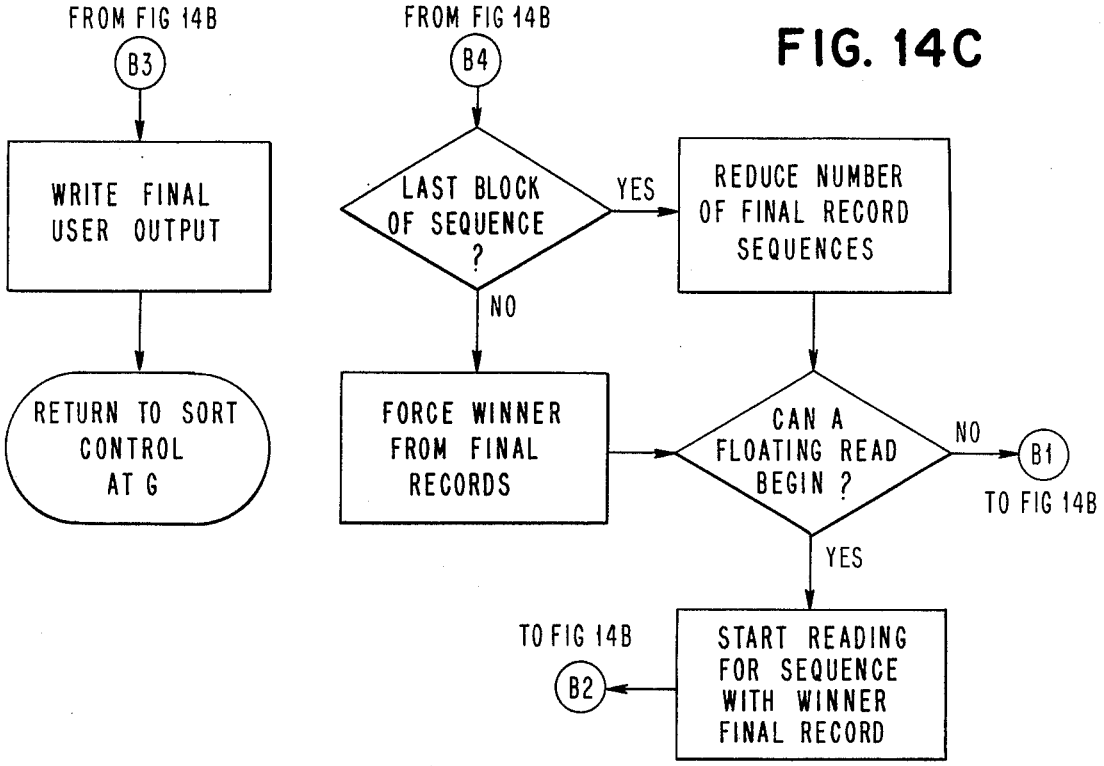
Figure 15A:
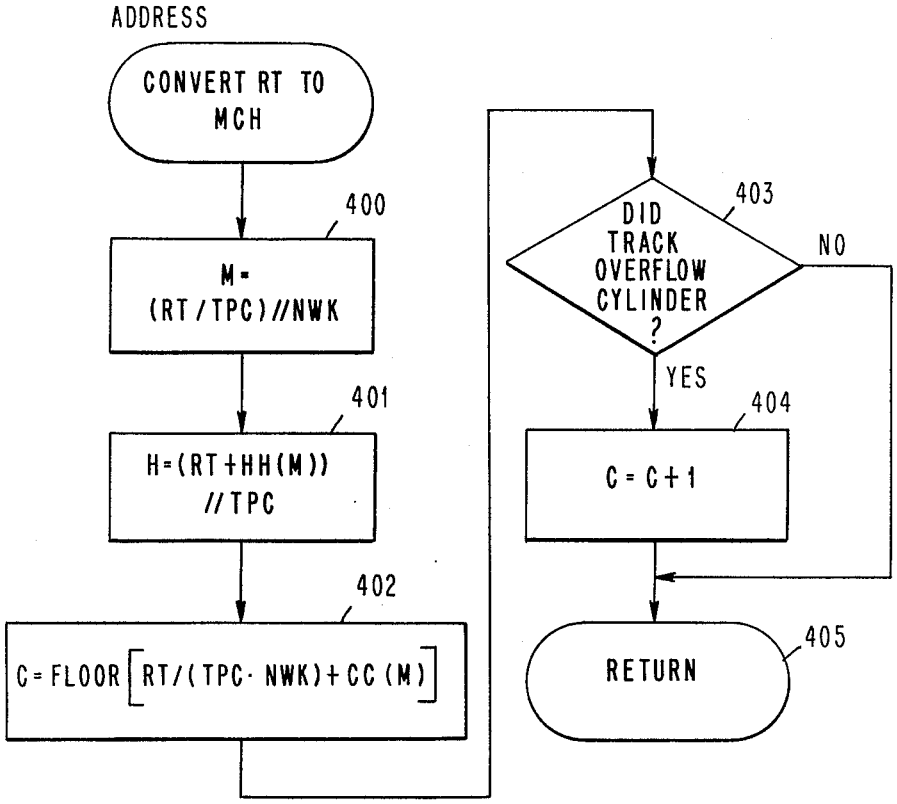
Figure 15B:
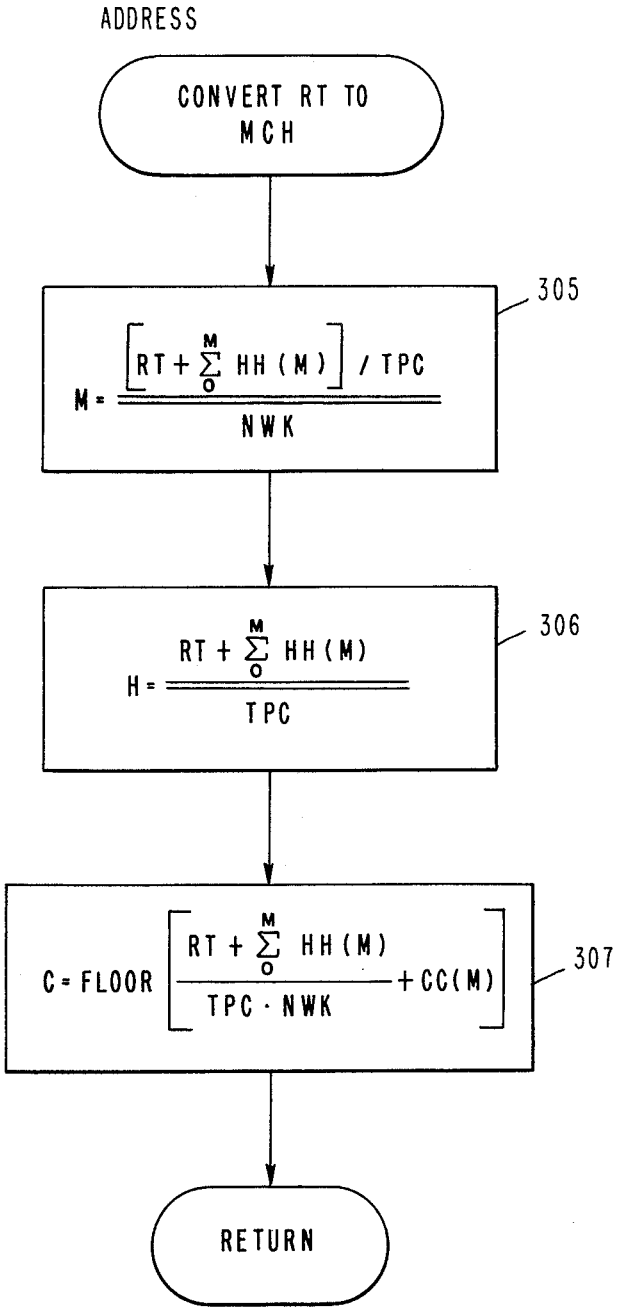
Figures 15D, 15E, 15F:
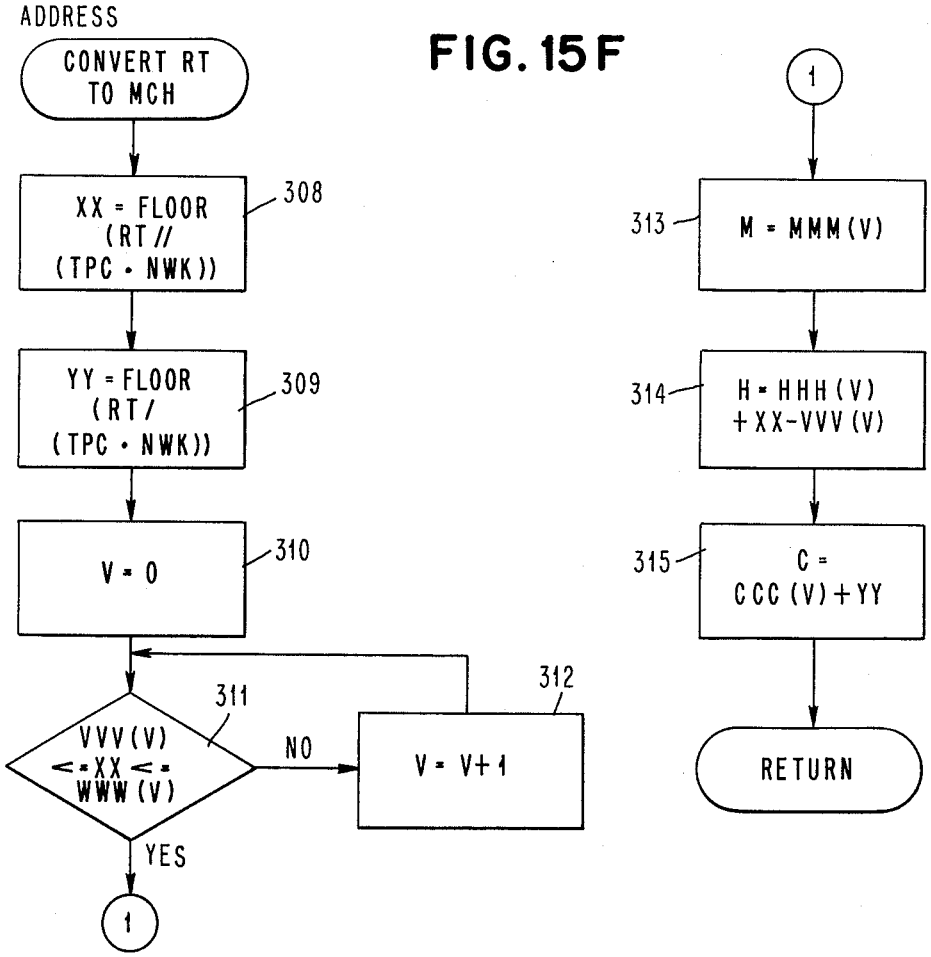
Figure 16A:
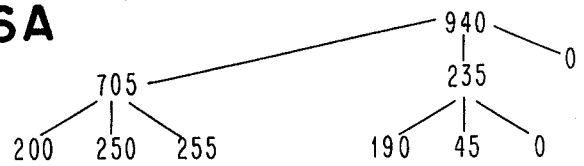
Figure 16B:
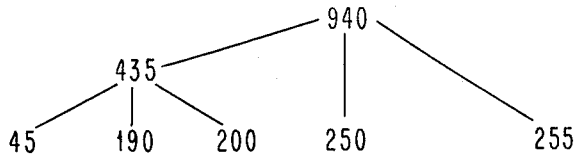
Figure 17A:
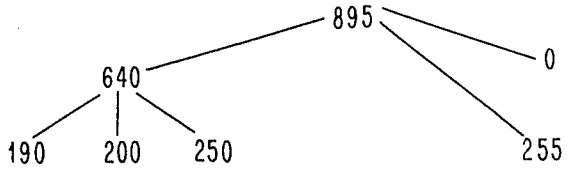
Figure 17B:
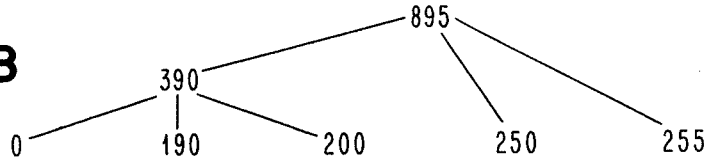
Figure 18:
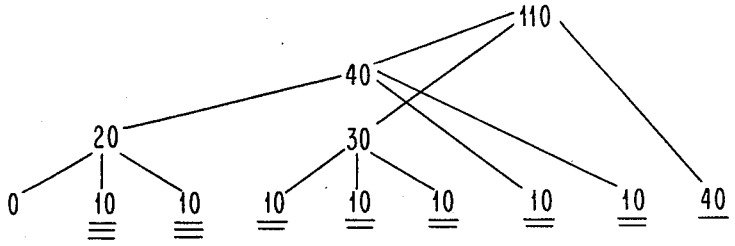
Figure 19:
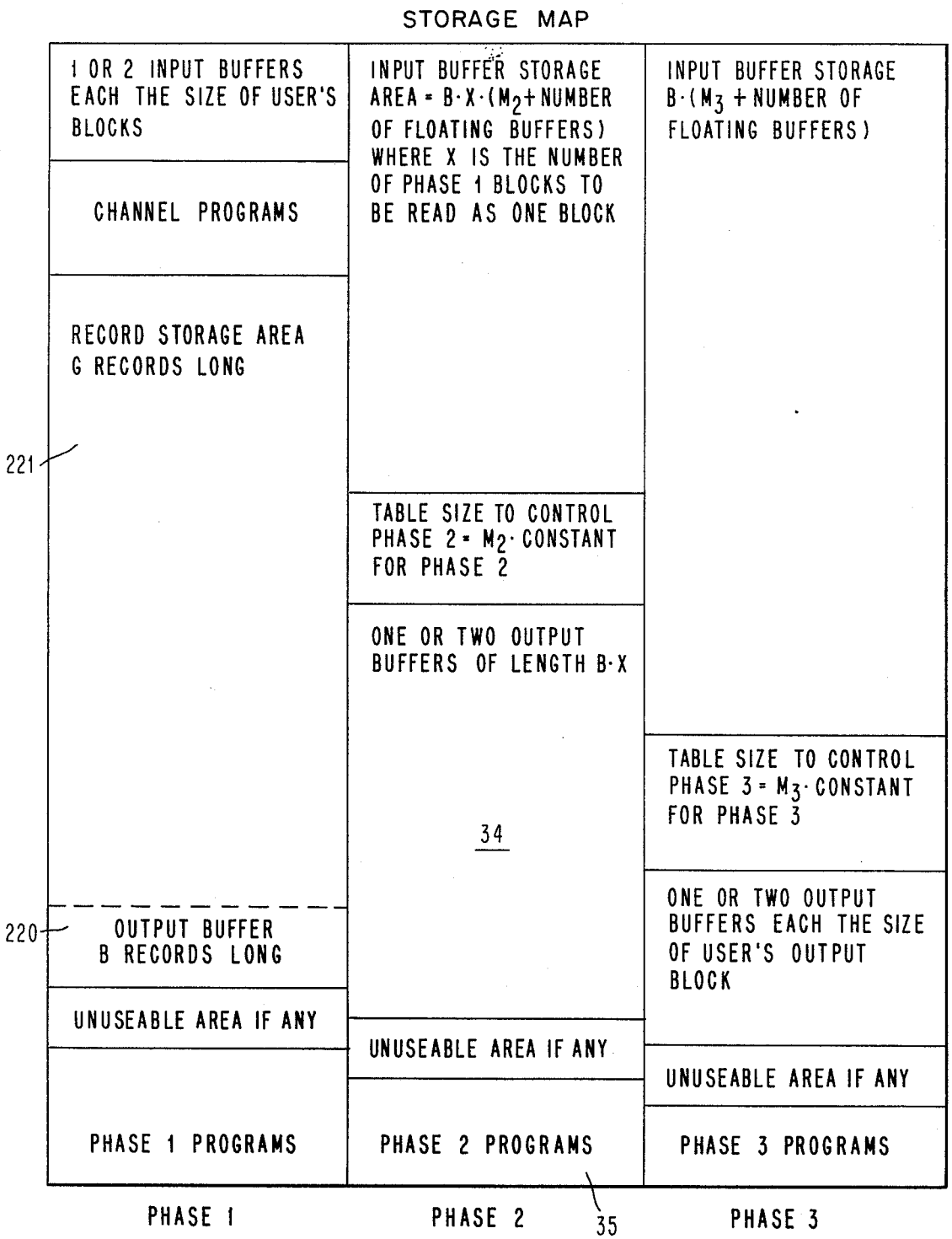

United States Defensive Publication [19] (H) [11] T972,003

Coleman, Jr. [43] Jul. 4, 1978

[54] SORT/MERGE ALGORITHM

[76] Inventor: Leslie Stinson Coleman, Jr., 19 Homer Pl., Poughkeepsie, N.Y. 12603

[21] Appl. No.: 844,324

[22] Filed: Oct. 11, 1977

Related U.S. Application Data

[63] Continuation of Ser. No. 552,389, Feb. 19, 1975, which is a continuation of Ser. No. 524,002, Nov. 15, 1974, which is a continuation of Ser. No. 199,691, Nov. 17, 1971, abandoned.

[51] Int. Cl.[2] ..... G11B 27/00

[52] U.S. Cl. ..... 364/300

[57] ABSTRACT

A sort/merge program incorporating a technique for optimizing the number of strings processed in phase 2, a recording handling technique for minimizing the number of records handled in phase 2, a flexible blocking technique and a flexible merge order technique whereby these parameters are reset to their best values subsequent to the internal sort and where the merge order of phase 2 may differ from the merge order of phase 3, a floating buffer technique to place next blocks of records into core prior to merging, a smart look-ahead technique to place those blocks needed next into the spare buffers, a distribution technique whereby work space on auxiliary storage disk devices can be regarded as a single work space regardless of the physical location of the storage spaces, a track interleave technique whereby each sequence is begun on a separate track, a block address chaining technique and a write-in-place technique for minimizing arm movements.

42 Claims, 21 Sheets Drawing,

80 Pages Specification

The file of this unexamined application may be inspected and copies thereof may be purchased (849 O.G. 1221, Apr. 9, 1968).

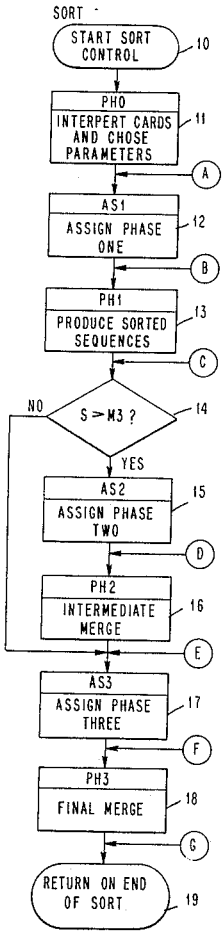

FIG. 15C

HH(0)=5 CC(0)=2 TPC = 20
HH(1)=10 CC(1)=5 NWK= 3
HH(2)=4 CC(2)=1 TPC • NWK=60

| | RT | M | C | H |
|---|---|---|---|---|
| 15B | 0 | 0 | 2 | 5 |
| 15A | 0 | 0 | 2 | 5 |
| 15B | 1 | | | 6 |
| 15A | 1 | | | 6 |
| 15B | 2 | | | 7 |
| 15A | 2 | | | 7 |
| | 3 | | | 8 |
| | 3 | | | 8 |
| | 4 | | | 9 |
| | 4 | | | 9 |
| | 5 | | | 10 |
| | 5 | | | 10 |
| | 6 | | | 11 |
| | 6 | | | 11 |
| | 7 | | | 12 |
| | 7 | | | 12 |
| | 8 | | | 13 |
| | 8 | | | 13 |
| | 9 | | | 14 |
| | 9 | | | 14 |
| | 10 | | | 15 |
| | 10 | | | 15 |
| | 11 | | | 16 |
| | 11 | | | 16 |
| | 12 | | | 17 |
| | 12 | | | 17 |
| | 13 | | | 18 |
| | 13 | | | 18 |
| | 14 | | | 19 |
| | 14 | | | 19 |
| | 15 | 1 | 5 | 10 |
| | 15 | 0 | 3 | 0 |
| | 16 | | | 11 |
| | 16 | | | 1 |
| | 17 | | | 12 |
| | 17 | | | 2 |
| | 18 | | | 13 |
| | 18 | | | 3 |
| | 19 | | | 14 |
| | 19 | | | 4 |

| RT | M | C | H |
|---|---|---|---|
| 20 | 1 | 3 | 15 |
| 20 | 1 | 5 | 10 |
| 21 | | | 16 |
| 21 | | | 11 |
| 22 | | | 17 |
| 22 | | | 12 |
| 23 | | | 18 |
| 23 | | | 13 |
| 24 | | | 19 |
| 24 | | | 14 |
| 25 | 2 | 1 | 4 |
| 25 | | | 15 |
| 26 | | | 5 |
| 26 | | | 16 |
| 27 | | | 6 |
| 27 | | | 17 |
| 28 | | | 7 |
| 28 | | | 18 |
| 29 | | | 8 |
| 29 | | | 19 |
| 30 | | | 9 |
| 30 | 1 | 6 | 0 |
| 31 | | | 10 |
| 31 | | | 1 |
| 32 | | | 11 |
| 32 | | | 2 |
| 33 | | | 12 |
| 33 | | | 3 |
| 34 | | | 13 |
| 34 | | | 4 |
| 35 | | | 14 |
| 35 | | | 5 |
| 36 | | | 15 |
| 36 | | | 6 |
| 37 | | | 16 |
| 37 | | | 7 |
| 38 | | | 17 |
| 38 | | | 8 |
| 39 | | | 18 |
| 39 | | | 9 |

| RT | M | C | H |
|---|---|---|---|
| 40 | 2 | 1 | 19 |
| 40 | 2 | 1 | 4 |
| 41 | 0 | 3 | 0 |
| 41 | | | 5 |
| 42 | | | 1 |
| 42 | | | 6 |
| 43 | | | 2 |
| 43 | | | 7 |
| 44 | | | 3 |
| 44 | | | 8 |
| 45 | | | 4 |
| 45 | | | 9 |
| 46 | | | 5 |
| 46 | | | 10 |
| 47 | | | 6 |
| 47 | | | 11 |
| 48 | | | 7 |
| 48 | | | 12 |
| 49 | | | 8 |
| 49 | | | 13 |
| 50 | | | 9 |
| 50 | | | 14 |
| 51 | | | 10 |
| 51 | | | 15 |
| 52 | | | 11 |
| 52 | | | 16 |
| 53 | | | 12 |
| 53 | | | 17 |
| 54 | | | 13 |
| 54 | | | 18 |
| 55 | | | 14 |
| 55 | | | 19 |
| 56 | | | 15 |
| 56 | 2 | 2 | 0 |
| 57 | | | 16 |
| 57 | | | 1 |
| 58 | | | 17 |
| 58 | | | 2 |
| 59 | | | 18 |
| 59 | | | 3 |

| VVV | WWW | MMM | CCC | HHH |
|---|---|---|---|---|
| 0 | 14 | 0 | 2 | 5 |
| 15 | 19 | 0 | 3 | 0 |
| 20 | 29 | 1 | 5 | 10 |
| 30 | 39 | 1 | 6 | 0 |
| 40 | 55 | 2 | 1 | 4 |
| 56 | 60 | 2 | 2 | 0 |

| VVV | WWW | MMM | CCC | HHH |
|---|---|---|---|---|
| 0 | 14 | 0 | 2 | 5 |
| 15 | 24 | 1 | 5 | 10 |
| 25 | 40 | 2 | 1 | 4 |
| 41 | 60 | 0 | 3 | 0 |